W. TIBBALS.
Revolver.
No. 55,743.
Patented June 19, 1866
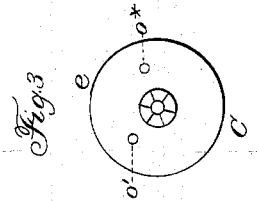
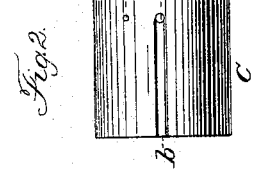
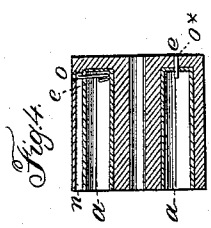
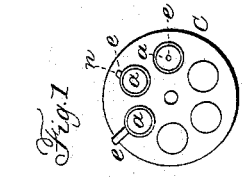
Witnesses
P.T. Dodge
Inventor
Wm Tibbals
By his atty
W.C. Dodge

UNITED STATES PATENT OFFICE.

WM. TIBBALS, OF SOUTH COVENTRY, CONNECTICUT.

IMPROVEMENT IN REVOLVING FIRE-ARMS.

Specification forming part of Letters Patent No. 55,743, dated June 19, 1866.

*To all whom it may concern:*

Be it known that I, WILLIAM TIBBALS, of South Coventry, in the county of Tolland and State of Connecticut, have invented certain new and useful Improvements in Cylinders for Fire-Arms; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a front-end view. Fig. 2, a side view; Fig. 3, a rear-end view; Fig. 4, a longitudinal section; and Figs. 5, 6, and 7, views of the cartridges to be used in my improved cylinder.

My invention relates to that class of fire-arms in which a revolving cylinder is used; and it consists in a peculiar manner of forming the chambers therein, to adapt it to the use of metallic cartridge-cases, in which a pin is used to ignite the charge.

C represents a cylinder having the chambers bored in it, but not extending entirely through, as shown clearly in Fig. 4. When it is desired to use the cartridge having a long pin projecting from the side, as shown in Fig. 5, a slot, $b$, as shown in Fig. 2, is cut in the side of the barrel through to the chamber to permit the pin $e$ to slide in as the cartridge is inserted from the front end of the cylinder. When this form is used the charge is ignited by having the hammer strike upon the projecting end of the pin, as is now done in arms using that style of cartridge.

To obviate the necessity of weakening the cylinder by cutting the slot $b$ in it, I propose to shorten the stem or pin $e$, as shown in Fig. 6, and simply cut a groove, $n$, in one side of the barrel or chamber of sufficient depth to permit the pin $e$ to slide therein, and thus allow the cartridge $a$ to be inserted, as shown in Figs. 1 and 4. At the rear end of the chamber, and directly over the pin $e$, a hole, $o$, is made through the side of the cylinder, as shown in Fig. 4, for the point of the hammer to strike through and hit the pin $e$.

Where the pin $e$ is inserted at the end of the cartridge, as shown in Fig. 7, I simply provide a hole, $o^*$, for the pin $e$ to rest in, as shown in Figs. 3 and 4, the pin either projecting through the rear of the cylinder or simply resting in the hole, and there struck by the point of the hammer.

When this style of cartridge is used, it can be shoved out, after it is exploded, by inserting a small rod through the hole $o^*$ from the rear; and when the style of cartridge shown in Fig. 6 is used a similar hole, $o'$, as shown in Figs. 3 and 4, is made at the rear end of the chamber, for the purpose of shoving out the cartridge-case by the insertion of a small rod, in a similar manner.

Either of these forms may be used, as preferred; but the last is obviously the best, as the barrel is not weakened, as in the others, by the cutting therein of the slot or groove.

Having thus described my invention, what I claim is—

Constructing the chamber of fire-arms with the groove or slot in its side for the reception of the pin-cartridge, substantially as herein shown and described.

WM. TIBBALS.

Witnesses:
M. C. MORGAN,
J. C. PORTER.